United States Patent [19]

Akiyama et al.

[11] Patent Number: 4,657,504

[45] Date of Patent: Apr. 14, 1987

[54] COMBUSTION BURNER

[75] Inventors: Tetsuo Akiyama, Nishinomiya; Saiji Arita, Higashiosaka, both of Japan

[73] Assignee: Chugai Ro Co., Ltd., Osaka, Japan

[21] Appl. No.: 789,942

[22] Filed: Oct. 21, 1985

[30] Foreign Application Priority Data

Jun. 28, 1985 [JP] Japan .................. 60-143686

[51] Int. Cl.⁴ .............................................. F23D 11/44
[52] U.S. Cl. ...................................... 431/166; 431/215
[58] Field of Search .................. 431/115, 116, 9, 166, 431/215

[56] References Cited

U.S. PATENT DOCUMENTS

| 964,031 | 7/1910 | Leahy | 431/115 |
|---|---|---|---|
| 2,485,656 | 10/1949 | Raskin | 431/186 |
| 3,852,022 | 12/1974 | Medeot et al. | 431/186 |
| 4,392,818 | 7/1983 | Wunning | 431/215 |
| 4,408,983 | 10/1983 | Masters et al. | 431/116 |
| 4,457,694 | 7/1984 | Maeda et al. | 431/90 |

FOREIGN PATENT DOCUMENTS 47-35714 10/1972 Japan .

Primary Examiner—Carroll B. Dority, Jr.
Attorney, Agent, or Firm—Wenderoth, Lind & Ponack

[57] ABSTRACT

A burner assembly of a type wherein both the combustion air and gaseous fuel are controlled by a pressure equalizing control device comprises an inner barrel and a combustion air preheating passage both arranged exteriorly of a gaseous fuel supply tube, an annular space defined exteriorly of the gaseous fuel supply tube and communicated with the preheating passage through at least one perforation in the inner barrel, and an exhaust passage provided with an exhaust gas sucking device and disposed adjacent the preheating passage.

9 Claims, 14 Drawing Figures

COMBUSTION BURNER

BACKGROUND OF THE INVENTION

The present invention generally relates to a combustion burner and, more particularly, to a combustion burner assembly of a type wherein heat of exhaust gases to be discharged is used to preheat both combustion air and gaseous fuel.

A burner assembly is well known wherein the pressure of the gaseous fuel and that of the combustion air are equalized to each other by means of an equalizing valve.

On the other hand, for the purpose of saving energy, it is a recent trend to use the combustion air after it has been preheated by heat recovered from exhaust gases.

However, in the prior art burner assembly employing the pressure equalizing control, it has been found that, when the combustion air is preheated, the combustion air expands which causes an increase in pressure which in turn brings about an increase in pressure of the gaseous fuel. The consequence is that the air-fuel ratio changes substantially, resulting in the emission of soot with a lowered combustion efficiency.

In view of the foregoing, where the pressures of the combustion air and the gaseous fuel are controlled to equalize with each other, the prior art burner assembly has a problem in that it requires the use of specially designed, expensive compensating equipment for each of the gaseous fuel supply line and the combustion air supply line to compensate for the change in air-fuel ratio.

SUMMARY OF THE INVENTION

The present invention is based on the finding that the problem inherent in the prior art burner assembly is attributable to the preheating of only the combustion air by the use of the heat of exhaust gases.

Accordingly, the present invention has for its essential object to provide an improved burner assembly wherein both the combustion air and the gaseous fuel are preheated, before they are mixed together to provide a combustible air-fuel mixture, by the utilization of heat evolved from exhaust gases.

To this end, the present invention provides a burner assembly of a type wherein both the combustion air and the gaseous fuel are controlled by a pressure equalizing control device, the burner assembly being provided with an inner barrel and a combustion air preheating passage means both arranged exteriorly of a gaseous fuel supply tube, an annular space defined exteriorly of the gaseous fuel supply tube and communicated with the preheating passage means through at least one perforation in the inner barrel, and an exhaust passage means provided with an exhaust gas drawing device and disposed adjacent the preheating passage means.

With this construction according to the present invention, the loss of pressure affected by temperature can be increased to lower the rate of flow of the gaseous fuel, thereby making it possible to maintain the air-fuel mixing ratio at a constant value.

BRIEF DESCRIPTION OF THE DRAWINGS

This and other objects and features of the present invention will be further explained from the subsequent description taken in conjunction with preferred embodiments thereof with reference to the accompanying drawings, in which.

DETAILED DESCRIPTION OF THE EMBODIMENTS

Figure 1:
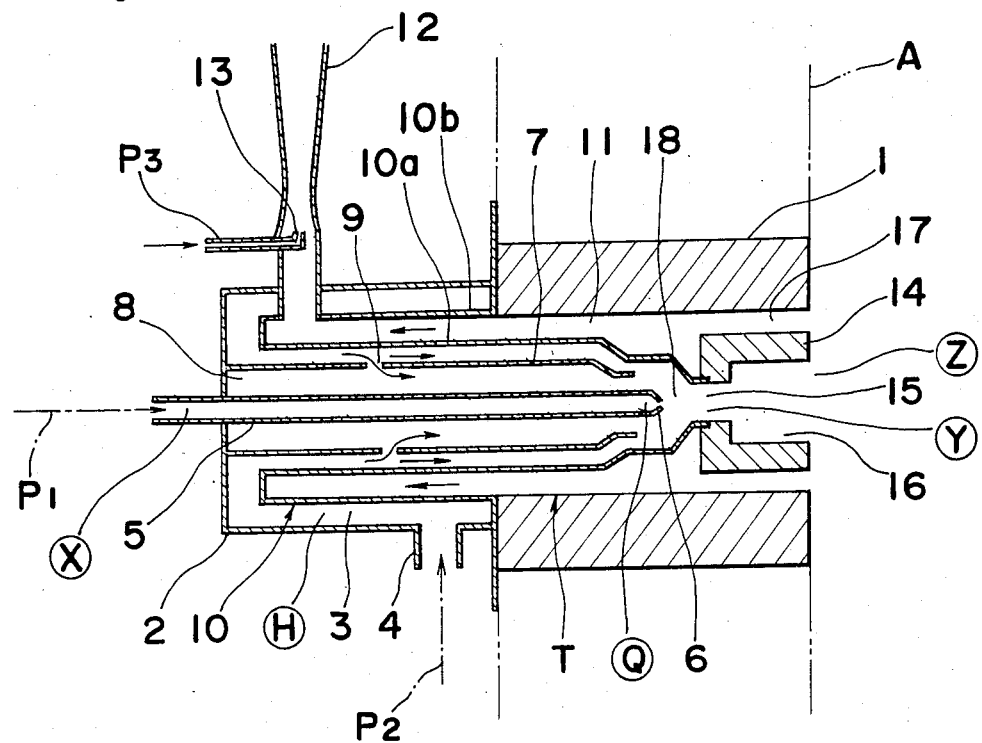
FIG. 1 is a schematic longitudinal sectional view of a burner assembly embodying the present invention.

Referring first to FIG. 1, reference numerals 1 and 2 represent a burner tile and a burner casing, respectively of a burner assembly T provided exteriorly of the burner tile 1, both of which are fitted in a furnace structure A. The burner casing 2 supports a gas supply tube 5 extending interiorly of the burner casing 2 from the outside thereof, the tube 5 having an inner end formed into a gas supply nozzle 6. The burner casing 2 also has an inner barrel 7 installed therein so as to exteriorly surround the gas supply tube 5 with an annular space 8 defined between the tube 5 and the barrel 7. As shown, one end of the barrel 7 remote from the gas supply nozzle 6 is closed by a wall of the casing 2 whereas the other end thereof adjacent the nozzle 6 is left open in coaxial relationship with the nozzle 6, a substantially intermediate portion of said barrel 7 adjacent the closed end thereof being formed with a circumferential row of perforations 9.

The burner casing 2 is formed with a combustion air supply port 4 in communication with a preheating passage 3 defined within the casing 2 exteriorly of the barrel 7 for the flow of the combustion air while the latter is preheated in a manner as will become clear from the subsequent description.

Reference numeral 10 represents an annular exhaust duct comprised of inner and outer walls 10a and 10b with an exhaust passage 11 defined therebetween, and positioned exteriorly of and in coaxial relationship with the barrel 7. This exhaust duct 10 extends in part within the burner casing 2 and in part within the burner tile 1 and is supported in position with the outer wall 10b rigidly secured to the burner tile 1 and also with the inner wall 10a secured to a throat area 15 of a combustion chamber defining structure 14 having a combustion chamber 16 defined therein. The inner and outer walls 10a and 10b are connected together at one end remote from the combustion chamber defining structure 14 and, hence, the annular exhaust passage 11 is closed at one end remote from the structure 14 and opened at the other end so as to define an annular exhaust port 17 between the burner tile 1 and the structure 14. Communicated with the annular exhaust passage 11 and protruding upwardly in a direction transverse to the longitudinal direction of the annular exhaust passage 11 is an exhaust gas drawing device which includes an eductor 12 for the discharge of exhaust gases, said eductor 12 having an inspirator also called an air injector, 13 built therein for jetting air into and upwardly through the eductor 12 thereby to draw from inside the furnace the high temperature exhaust gases to be discharged to the outside.

The burner assembly T has a mixing chamber 18 defined by the inner wall 10a adjacent the joint between the inner wall 10a and the structure 14 and frontwardly of the gas supply nozzle 6, which mixing chamber 18 is communicated with both the gas supply tube 5 and the annular space 8 on the one hand, and with the combustion chamber 16 through the throat area 15 on the other hand.

Figure 2:
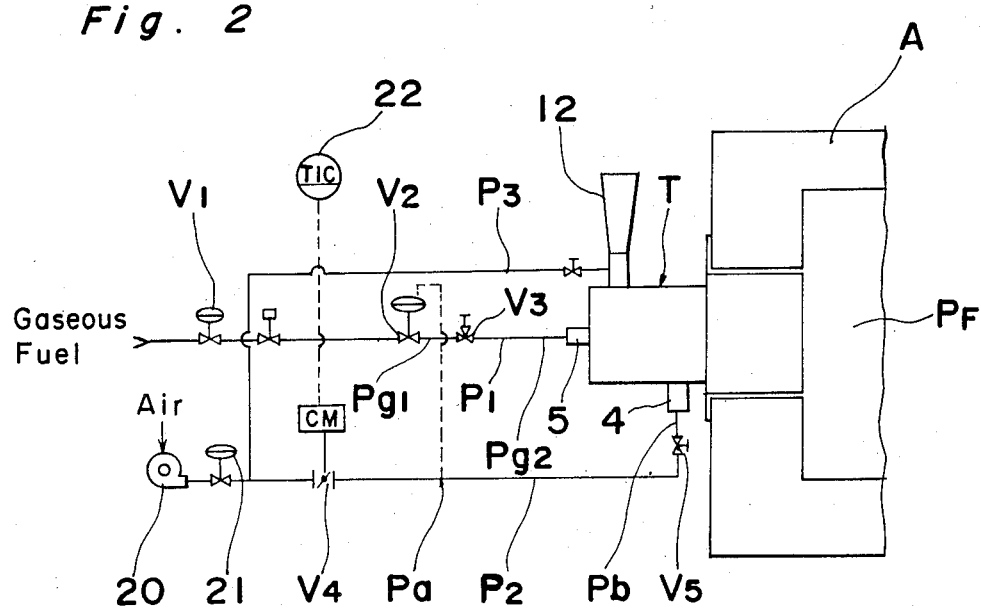
FIG. 2 is a diagram showing a pressure equalizing control circuit for both the combustion air and the gaseous fuel in relation to the burner assembly.

A pressure equalizing system, that is, a control system for equalizing the pressure of gaseous fuel with that of combustion air, will now be described with particular reference to FIG. 2.

Gaseous fuel is supplied to the gas supply tube 5 of the burner assembly T through a fuel supply line P1 having a reducer valve V1, a pressure equalizing valve V2 and a regulating valve V3 all disposed thereon. On the other hand, combustion air is supplied to the air supply port 4 through an air supply line P2 leading from a blower 20 via a pressure regulator 21, a control valve V4 operatively associated with a furnace temperature adjustment 22, and a regulating valve V5 all disposed on the air supply line P2. A portion of the air supply line P2 between the pressure regulator 21 and control valve V4 is communicated with the inspirator 13 through a branch line P3 for the supply of compressed air to the inspirator 13.

The pressure equalizing valve V2 is of a pressure responsive type and, therefore, the opening of such valve V2 can be automatically adjusted in response to the pressure of the combustion air flowing through a portion of the air supply line P2 downstream of the control valve V4 with respect to the direction of flow of the combustion air towards the air supply port 4.

Hereinafter, the operation of the burner assembly T including the fluid circuit shown in FIG. 2 will be described.

Gaseous fuel supplied into and flowing through the gas supply tube 5 is jetted from the nozzle 6 towards the combustion chamber 16 through the throat area 15 by way of the mixing chamber 18. As the gaseous fuel emerges outwards from the nozzle 6, it is mixed, within the mixing chamber 18, with the combustion air supplied thereinto partly through the preheating passage 3 and partly through the annular space 8, the resultant air-fuel mixture being burned in the combustion chamber 16. On the ther hand, exhaust gases produced upon combustion of the air-fuel mixture inside the furnace can be exhausted to the outside through the exhaust duct 10 by the operation of the eductor 12.

As the exhaust gases flow through the exhaust duct 10, the latter acts as a heat exchanger for preheating the combustion air flowing through the preheating passage 3. The perforations 9 defined in the wall of the barrel 7 permit portions of the combustion air so preheated to flow into the annular space 8 such that the wall of the gas supply tube 5 and, hence, the gaseous fuel flowing through the tube 5 can be preheated by the preheated combustion air flowing in the annular space 8 around the gas supply tube 5. The fact that the gaseous fuel flowing in the gas supply tube 5 is preheated by heat exchange with the preheated combustion air flowing in the annular space 8 is advantageous in that, because the pressure of the gaseous fuel inside the gas supply tube 5 increases as a result of the thermal expansion of the preheated gaseous fuel, the opening of the pressure equalizing valve V2 will not be varied so much.

This is in contrast to the prior art, according to which, as a result of the thermal expansion of the preheated combustion air, the pressure of the combustion air downstream of the control valve V4 increases, causing the opening of the pressure equalizing valve V2 to increase correspondingly with the consequence of the increase in pressure of the gaseous fuel to such an extent as to result in change in air-fuel ratio.

It is to be noted that, if the opening of the mixing chamber 18 which communicates with the combustion chamber 16 is throttled or constricted by the throat area 15 such as used in the illustrated embodiment, the pressure inside the mixing chamber 18 can act as a back pressure to the gaseous fuel and, therefore, the change in air-fuel ratio can advantageously be minimized.

As hereinbefore described, and according to the present invention, the burner assembly a heat recovery type is of a construction wherein both the gas supply tube and the nozzle are surrounded by the recuperator inner barrel which is in turn surrounded by a wall of the recuperator for facilitating the heat exchange between the combustion air and the high temperature exhaust gases exhausted by the eductor from the furnace, and, at the same time, employs a so-called pressure equalizing control system wherein the pressure equalizing valve is disposed on the gas supply line, leading to the gas supply tube, so that a control motor can be driven in response to a signal from the temperature adjustment to control the control valve thereby to cause the pressure Pa of the combustion air to change and also to cause the combustion air to adjust the pressure equalizing valve in the gas supply line. Accordingly, with this system, assuming that no temperature change occurs in both the combustion air and the gaseous fuel, the flow of the mass of the fuel gas varies according to the following equation $$Pg2 - PF = k \times (Pb - PF)$$

wherein Pg2 represents the pressure of the gaseous fuel at the inlet to the burner assembly, Pb represents the pressure of the combustion air at the inlet to the burner assembly, PF represents the pressure within the furnace and k represents a constant.

Figure 3:
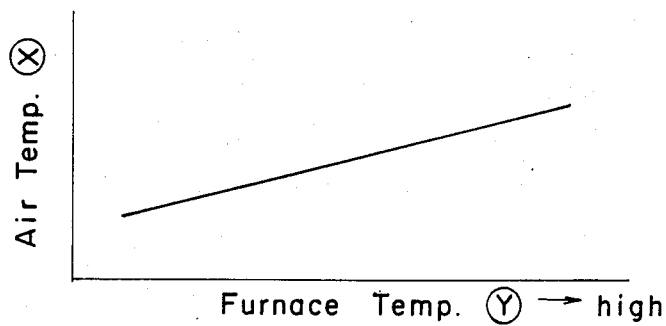
FIG. 3 is a graph showing the relationship between the temperature of the combustion air and that of a furnace.
Figure 4:
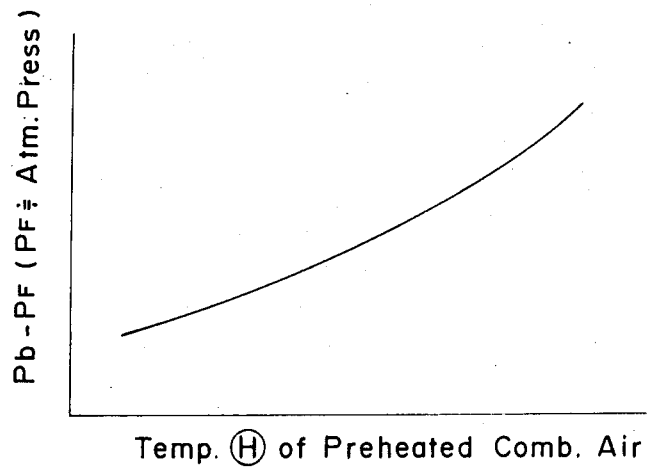
FIG. 4 is a graph showing the relationship between the difference in pressure and the temperature of the preheated combustion air.
Figure 5:
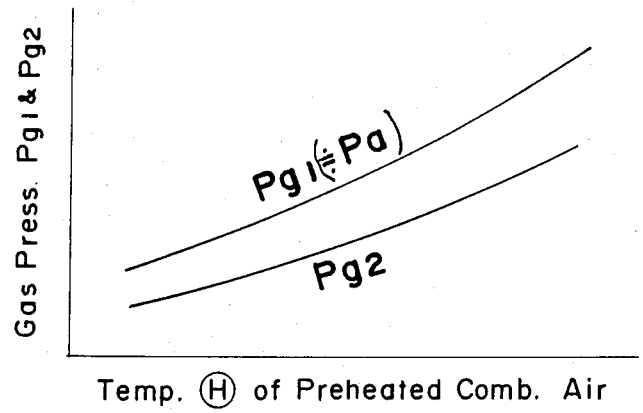
FIG. 5 is a graph showing the relationship between the pressure of the gaseous fuel and the temperature of the preheated combustion air.
Figure 6:
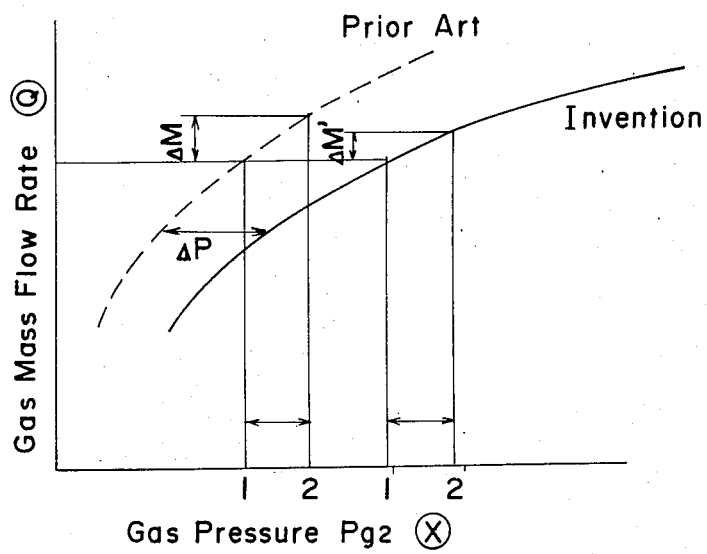
FIG. 6 is a graph showing the relationship between the rate of flow of a mass of gases and the pressure of the gaseous fuel.

Let it be assumed for the purpose of simplicity that the temperature inside the furnace is increased while a given load is imposed on the burner assembly. Then, as shown in FIG. 3, the higher the temperature $\text{\textcircled{Y}}$ at the inlet to the furnace, the higher the temperature $\text{\textcircled{H}}$ of the preheated combustion air, and therefore, the difference (Pb−PF) in air pressure increases with the consequence increase of both of the gas pressures of both of the pressures Pg1 and Pg2 as shown in FIGS. 4 and 5. The increase of the pressure Pg2 brings about the increase of the gas mass flow rate as shown in FIG. 6, resulting in the change of the air-fuel mixing ratio to such an extent as to result in the emission of black smoke and the unnecessary consumption of energy.

However, according to the present invention, the nozzle is so positioned upstream of the throat area $\text{\textcircled{Y}}$ that the difference in air pressure at the throat area can be added to the flow of the gaseous fuel as a "back pressure". Moreover, the inner barrel is formed with one or more perforations for enabling the supply of a portion of the preheated combustion air into the annular space around the gas supply tube so that the flow of the gaseous fuel can also be preheated. Accordingly, as shown in FIG. 6, for a given quantity of change in gas pressure Pg2 at the inlet $\text{\textcircled{X}}$ to the burner assembly, the resistance exhibited by the throat area in the burner assembly of the present invention is higher and, therefore, the change in gas mass flow rate $\text{\textcircled{Q}}$ in the burner assembly of the present invention is smaller than that in the prior art burner assembly, even though the increase of the gas pressure remains the same as that in the burner assembly with no throat area. Thus, according to the present invention, the deviation of the air-fuel ratio can be advantageously minimized.

Figure 7:
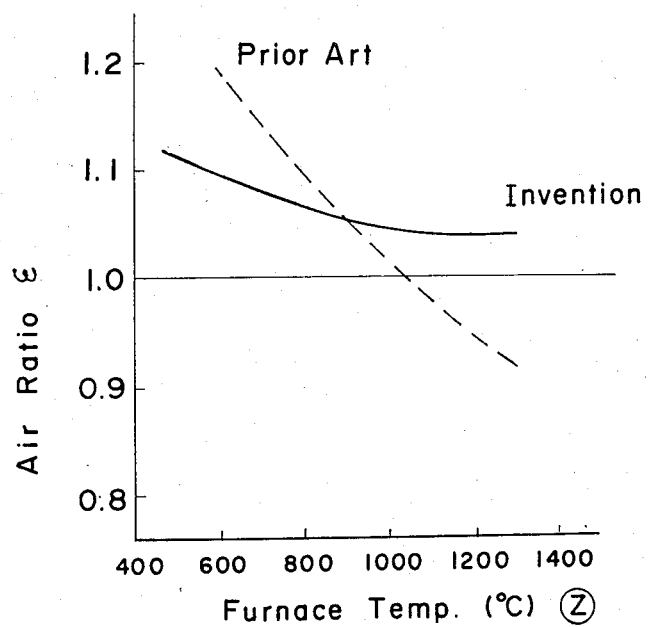
FIG. 7 is a graph showing the relationship between the air-fuel ratio and the temperature inside the furnace.

FIG. 7 illustrates the change in air-fuel mixing ratio $\epsilon$ relative to furnace temperature $\text{\textcircled{Z}}$, wherein the chain line represents that exhibited by the pressure equalizing system of the prior art burner assembly with no temperature correction and the solid line represents that exhibited by the pressure equalizing system of the burner assembly of the present invention with no temperature correction. It will readily be seen that, in the burner assembly according to the present invention, the air-fuel mixing ratio $\epsilon$ is substantially constant regardless of change in furnace temperature.

Hereinafter, another embodiment of the present invention will be described with particular reference to FIGS. 8 to 14. It is, however, to be noted that those parts which are shown in FIGS. 8 to 14, but which are similar to that shown in FIGS. 1 to 7, are designated by like reference characters employed in FIGS. 1 to 7 for the sake of brevity.

Figure 8:
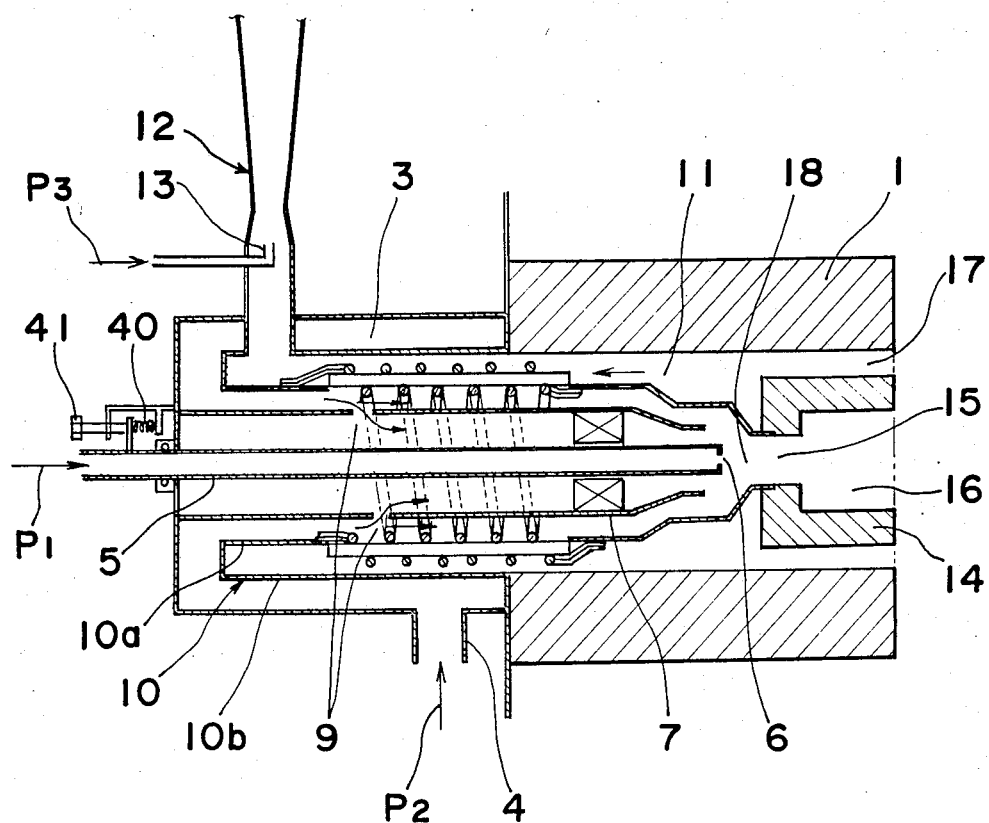
FIG. 8 is a view similar to FIG. 1, showing another preferred embodiment of the present invention.
Figure 9:
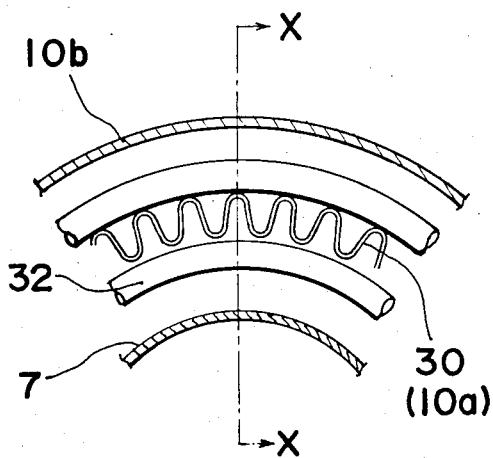
FIG. 9 is a fragmentary transverse sectional view, on an enlarged scale, of the interior of the burner shown in FIG. 8.
Figure 10:
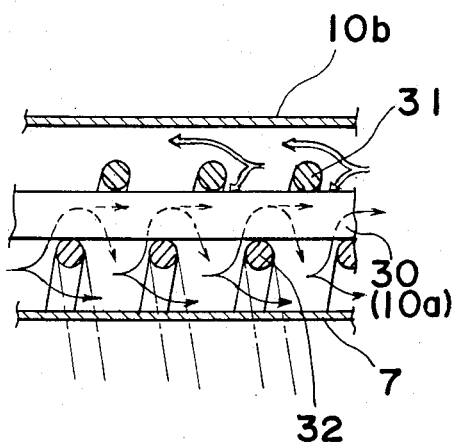
FIG. 10 is a cross-sectional view taken along the line X—X in FIG. 9.

Referring first to FIG. 8, the combustion air at ambient temperature supplied to the burner assembly is preheated by the heat exchanger, provided internally of the burner assembly, having absorbed heat from the exhaust gases. The preheated combustion air is mixed at the throat area 15 with the gaseous fuel to produce a blaze extending into the furnace. The exhaust gases produced within the furnace are drawn into the heat exchanger by the eductor 12. For minimizing the external dimensions of the heat exchanger, a heat conducting portion of the heat exchanger, that is, the inner wall 10a, is partly corrugated at 30, as is conventionally employed, to increase the total surface area and, at the same time, turbulent accelerators 31 and 32 are employed on both sides of the axially extending grooves of the corrugated wall 30 for facilitating the flow of fluid and also for increasing the heat transfer rate. As best shown in FIGS. 9 and 10, the turbulent accelerators 31 and 32 are employed each in the form of a coiled steel rod and are coiled radially outwardly and inwardly around corrugated wall 30 with the turbulent accelerators 31 and 32 exposed to the flow of the exhaust gases and the flow of the preheated combustion air, respectively. As best shown in FIG. 10, at the downstream side of each convolution of the coiled steel rod forming the respective turbulent accelerator 31 or 32 with respect to the direction of flow of the exhaust gases or the preheated combustion air, there is formed a turbulent vortex to facilitate the flow of the exhaust gases or the preheated combustion air axially through the grooves of the corrugated wall 30. The turbulent heat transfer rate could be increased to 35 to 50 Kcal/mHr°C. in contrast to 15 to 25 Kcal/mHr°C. which has been exhibited by the use of a smooth or bare barrel. Because of the above described effect, the recuperator can be rendered compact in size.

Figure 11:
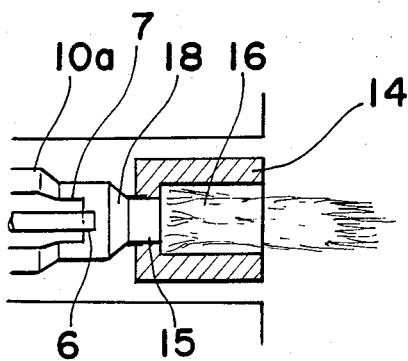
FIG. 11 is a longitudinal sectional view of a portion of the burner showing a nozzle in one position producing a short flame.
Figure 12:
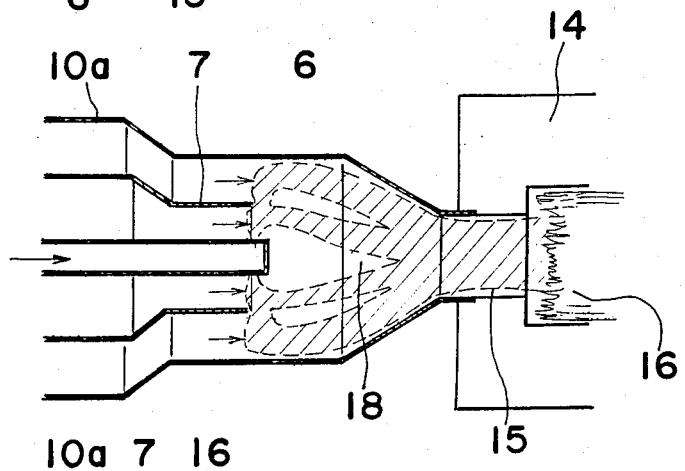
FIG. 12 is a view similar to FIG. 11, showing the position of the nozzle on an enlarged scale.

With the construction shown in FIG. 8, the length of the blaze produced in the combustion chamber 16 can be adjustable. For this purpose, the gas supply tube 5 with the nozzle 6 defined at the free end thereof adjacent the mixing chamber 18 is supported for movement in a direction axially thereof, the position of which can be adjusted by turning a bolt 41 to adjust the length of a compression spring 40 which acts to urge the gas supply tube 5 in one direction, for example, leftwards as viewed in FIG. 8. It is to be noted that, instead of the use of the spring 40 and the bolt 41 in combination therewith, a hydraulic or electromechanical cylinder may be employed, in which case the position of the gas supply tube 5 and, hence, the length of the blaze, can be controlled at a remote location. As best shown in FIGS. 11 and 12, when and so long as the gas supply tube 5 is axially retracted to a position where the nozzle 6 is located adjacent the annular open end of the barrel 7, the gaseous fuel emerging outwardly from the nozzle 6 impinges upon the annular edge at the annular open end of the barrel 7 having been rapidly diffused radially outwardly, whereafter the diffused gaseous fuel is mixed in the mixing chamber 18 with the combustion air flowing thereinto through the barrel 7 and through the space between the barrel 7 and the inner wall 10a of the annular exhaust duct 10. The air-fuel mixture so formed is blasted through the throat area 15 into the combustion chamber, thus producing a sharp blaze of short length.

Figure 13:
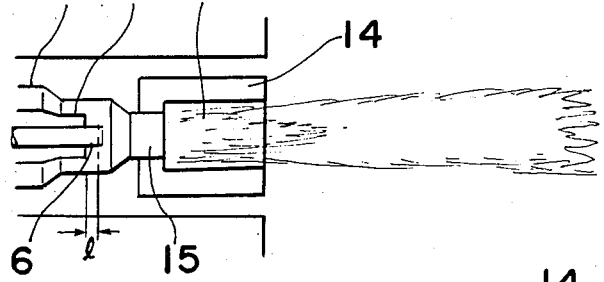
FIG. 13 is a view similar to FIG. 11, showing the nozzle in another position producing a long flame.
Figure 14:
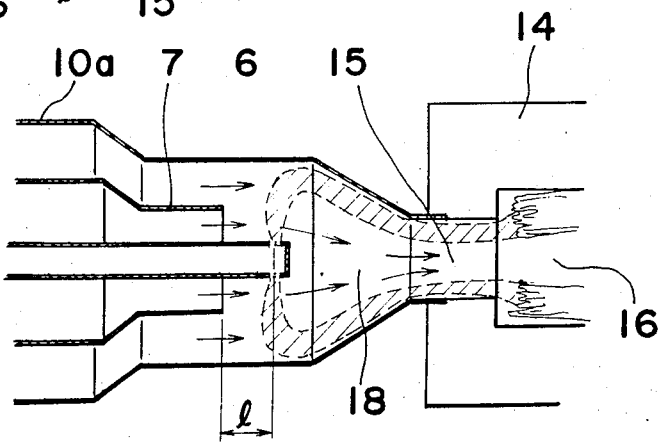
FIG. 14 is a view similar to FIG. 13, showing such another position of the nozzle on an enlarged scale.

On the other hand, when the gas supply tube 5 is axially rightwardly moved to another position where the nozzle 6 projects towards the throat area 15, the gaseous fuel emerging outwards from the nozzle 6 is mixed with the combustion air flowing into the mixing chamber 18 mainly through the barrel 7, but the uniform mixing of the fuel with the air has not yet been completed within the throat area 15 and, therefore, the blaze formed within the combustion chamber 16 is that of the enriched air-fuel mixture and is bright and long in length as best shown in FIGS. 13 and 14. In the practice of the present invention, the maximum available length of the blaze is made to be twice the minimum available blaze length.

From the foregoing description of the preferred embodiments of the present invention, it should be clear that, since both the combustion air and the gaseous fuel are preheated, the burner assembly according to the present invention requires no employment of expensive equipment for maintaining the ratio of mass flow rate between the combustion air and the gaseous fuel at substantially a constant value and the employment of the inexpensive pressure equalizing control device is sufficient and effective to stabilize the air ratio.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A burner assembly of a type wherein both the combustion air and gaseous fuel are controlled by a pressure equalizing control device, which assembly comprises:
   a gas supply tube for the supply of gaseous fuel, said gas supply tube having a gas supply nozzle at a free end thereof;
   an inner barrel surrounding the gas supply tube with an annular space formed between said gas supply tube and said inner barrel, said inner barrel having at least one perforation therethrough;
   a combustion air preheating passage means for supplying combustion air to mix with the gaseous fuel, said combustion air preheating passage means disposed exteriorily of the inner barrel and in fluid communication with said annular space; and
   an exhaust passage means positioned exteriorily of said inner barrel and in heat exchange relationship with said combustion air preheating passage means, said exhaust passage means including an inner wall and an outer wall, said inner wall coaxially arranged with respect to said outer wall to form an exhaust duct therebetween, said exhaust passage means further including an exhaust gas drawing device positioned downstream of said exhaust duct with respect to the direction of flow of exhaust gases for the discharge of the exhaust gases through said exhaust duct, said inner wall of said exhaust passage means being constricted at an end thereof adjacent said gas supply nozzle to define a throat area downstream of said gas supply nozzle with respect to the direction of supply of combustible gases through said gas supply tube and a mixing chamber being formed radially inward of said inner wall of said exhaust passage means between said gas supply nozzle and said throat area;
   whereby combustion air passing through said combustion air preheating passage means is heated by said exhaust gases passing through said exhaust passage means and the thus heated combustion air passes through said at least one perforation in said inner barrel to heat gaseous fuel passing through said gas supply tube which thereby increases the pressure of the gaseous fuel which in combination with back pressure created by said constricted inner wall of said exhaust passage means minimizes the change in air-fuel ratio caused by heating of the combustion air.

2. The burner assembly as claimed in claim 1, further comprising a burner tile secured to a furnace structure, said burner tile having an opening in which receives said inner wall of said exhaust passage means, a combustion chamber defining structure being connected to said constricted end of said inner wall of said exhaust passage means, said combustion chamber defining structure forming a combustion chamber downstream of and adjacent to said throat area.

3. The burner assembly of claim 1, wherein a generally cylindrical, common wall separates said combustion air preheating passage means and said exhaust passage means, said common wall having a corrugated portion thereof and at least one turbulent accelerator disposed on at least one side of said common wall.

4. The burner assembly as claimed in claim 1, wherein said gas supply tube is movably supported in said inner barrel for adjusting the position of said gas supply nozzle in a direction axially of said gas supply tube and means are provided for adjusting the position of said gas supply tube and gas supply nozzle relative to said inner barrel.

5. The burner assembly as claimed in claim 2, wherein said gas supply tube is movably supported in said inner barrel for adjusting the position of said gas supply nozzle in a direction axially of said gas supply tube and means are provided for adjusting the position of said gas supply tube and gas supply nozzle relative to said inner barrel.

6. The burner assembly as claimed in claim 3, wherein said gas supply tube is movably supported in said inner barrel for adjusting the position of said gas supply nozzle in a direction axially of said gas supply tube and means are provided for adjusting the position of said gas supply tube and gas supply nozzle relative to said inner barrel.

7. The burner assembly of claim 1, further comprising means connected to said gas supply tube for supplying and controlling the pressure of gaseous fuel in said gas supply tube and means connected to said combustion air preheating passage means for supplying and controlling the pressure of air in said combustion air preheating passage means.

8. The burner assembly of claim 1, wherein said inner barrel is open at an end thereof facing said mixing area.

9. The burner assembly of claim 1, wherein said exhaust duct is positioned within said combustion air preheating means whereby combustion air and gaseous fuel are preheated by heat transfer from exhaust gases passing through said exhaust duct.

* * * * *